United States Patent Office 3,041,144
Patented June 26, 1962

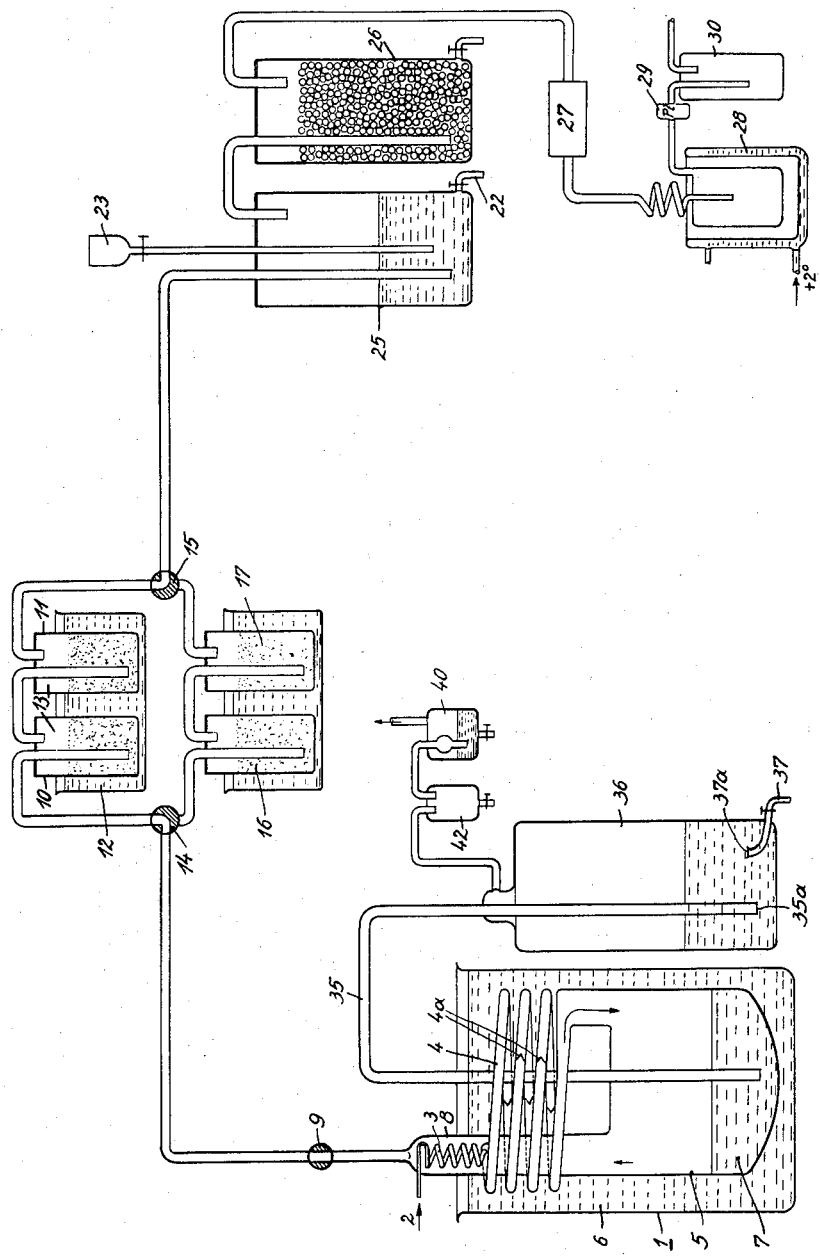

3,041,144
PROCESS FOR PRODUCTION OF HYPERPURE SILICON BY HEAT DECOMPOSITION OF A CHLORO-SILANE
Hans Schering, Berlin-Haselhorst, Germany, assignor to Siemens-Schuckertwerke Aktiengesellschaft, Erlangen, Germany, a corporation of Germany
Filed Sept. 22, 1960, Ser. No. 57,820
Claims priority, application Germany Sept. 28, 1959
10 Claims. (Cl. 23—223.5)

My invention relates to an improvement in process for making hyperpure silicon, as required particularly for semiconductor diodes, transistors and other electronic semi-conductor devices, such processes employing the reduction of gaseous silanes by hydrogen, to form elemental silicon. Such processes produce as by-products higher molecular weight silanes, and the hydrogen chloride, mainly. In such processes a suitable silane, for example silico-chloroform ($SiHCl_3$) or tetrachlorsilicon ($SiCl_4$) is decomposed or reacted with hydrogen. The reaction can be carried out, for example, by effecting an electric discharge in a mixture of silane and hydrogen, or by increasing the temperature of the gas mixture up to about 800° C. or more, or by passing the mixtures in contact with a silicon rod that is heated by passage of an electric current therein. With such methods, a large proportion of the silanes, generally about 70%, is not reacted. It is known to recover the unused silane by freezing at −120° C., and to separate the hydrogen chloride by freezing with liquid air at −186° C. Since the liquefying temperature of hydrogen chloride is −85° C., the result is that in these known recovery methods at least a portion of the hydrogen chloride is separated together with the silanes. Therefore, to recover the pure silanes, the product separated at −120° C. must subsequently be distilled. Furthermore, the hydrogen chloride separates in solid phase at −186° C., which may clog the separating plant.

An object of the invention is to simplify and improve the recovery of the unused starting materials present in production of hyperpure silicon by reducing silanes with hydrogen.

According to the invention, the gaseous mixture of hydrogen, silanes and hydrogen chloride, issuing from the reaction vessel, is cooled in a first cooling trap to a temperature slightly above −85° C., at which temperature the constituent silanes are to a large extent separated in liquid state. The residual mixture is passed through at least one other cooling trap which is cooled in the same manner, and is provided with an adsorber having a large surface area so that the residual silanes are retained.

Solid carbonic acid (sublimation point −78° C.) is particularly suitable for cooling the traps. The silanes are recovered un-contaminated with hydrogen chloride. The latter is not appreciably soluble in the silanes. It is advantageous to pre-cool the mixture in accordance with the counter-flow principle, after it passes into the first cooling trap. The first cooling trap preferably comprises a coiled tube and a following portion or chamber of large cross section in which the silane fog, essentially already formed in the coil, can settle. It is advantageous to provide the interior of the coiled tube with structures which cause turbulence or whirling of the gas flow. The initially very small droplets of the fog agglomerate to larger drops in the gas swirls thus produced. By virtue of their higher sinking speed, the enlargement of the drops promotes the settling of the fog in the said chamber of large cross section.

The new method permits the scavenging of the hydrogen chloride with water after separation of the silanes, so that all original substances or reaction products, with the exception of the hydrogen that remains gaseous, are recovered in liquid form and thus can be removed in a simple manner from the separating plants. In this connection, it is noted that, when the hydrogen chloride is being washed out with water, solid silicon compounds in fine distribution may occur, if during this step the gas mixture still contains silanes. However, in the method according to the invention, the silanes are previously separated so completely that disturbances by separation of solid particles in the tubes, conduits and valves of the separating plants do not occur. If water of highest purity is used for scavenging the hydrogen chloride, the high-purity hydrochloric acid thus obtained constitutes a valuable side product of the method.

An embodiment of the method according to the invention will be described presently by way of example, with reference to the equipment illustrated schematically in the accompanying drawing.

The first cooling trap of the plant is generally denoted by 1. The mixture of hydrogen, silanes and hydrogen chloride passes, in the direction of the arrow 2, into a coil 3 in which it is pre-cooled in counterflow by previously cooled gas. Connected to the coil tube 3 is another coil tube 4 which is directly cooled by the coolant 6, consisting, for example, of a mixture of solid carbonic acid and methyl alcohol. In the coil 4 are angular strips 4a of sheet metal, to cause turbulence of the flowing gas. As a result, the droplets of the silane fog already formed in the coil 4 will accumulate into larger drops. The mixture then flows into a container 5 of large cross section in which the flow velocity is so slight that the silane fog can settle. The sinking speed of the drops of fog formed in the tube 4 is approximately 5 mm./second. The cross section of the container 5 and the gas quantity flowing through the container per unit of time are consequently to be such that the flow velocity in the left portion of the container, where the gas mixture ascends, is below this value. This makes it possible, when performing the method on a technological scale, to separate about 90 to 97% of the silanes in liquid form, depending upon the flow velocity. The liquefied silanes are denoted in the drawing by 7.

The residual gas mixture now passes through a pipe 8 which surrounds the cooling coil 3, and then flows through a valve 9 to two cooling traps 10 and 11 which are likewise cooled with a mixture of methyl alcohol and solid carbonic acid 12, and which are provided with silica gel, in chambers 13. In the cooling traps 10 and 11, the residual 10% of the silanes are adsorbed practically completely.

Subsequently, the mixture of hydrogen and hydrogen chloride passes through one or more flasks 25 in which the hydrogen chloride is washed out by means of water. Water of the highest available purity is used for washing. The resulting hydrochloric acid, also of highest purity, can be drained at 22 from time to time. Water can be replenished at 23.

Thereafter the remaining hydrogen is pre-dried in a vessel 26 filled with glass beads, and is then compressed by means of a compressor 27. The greatest portion of the water vapor is separated in a condenser 28 cooled with ice water. To burn any residual oxygen that may be present, the hydrogen is subsequently passed over a platinum or palladium catalyst 29. Final drying is carried out in a cooling trap 30 provided with liquid air or solid carbonic acid. In lieu thereof, the final drying may also be performed with phosphorous pentoxide.

The separated liquid silanes are tapped from the vessel 5 by siphon 35, leading to a collecting vessel 36. The vessel 36 has a closable drain 37, the inlet opening 37a of which is slightly higher than the outlet opening 35a of the siphon 35. Thus the liquid column in siphon 35 is never interrupted. To fill siphon 35, valve 9 is temporarily closed. This causes superpressure in vessel 5, so that the liquid 7 is forced into siphon 35. When the valve 9 is opened, the pressure in vessel 5 is also somewhat higher than in vessel 36, at all times.

From time to time, the cooling traps 10 and 11 are scavenged with hydrogen at room temperature. The scavenging hydrogen then receives the silanes adsorbed by the silica gel. This silane-laden hydrogen can again be recycled, at 2, into the separating plant, in order to recover an additional 9% of the silanes. During regeneration of the cooling traps 10 and 11, the valves 14 and 15 can be turned in order to insert two auxiliary silica gel cooling traps 16 and 17, for continuous plant operation.

In order to obtain, on the one hand, a pressure compensation in vessel 36 and to prevent, on the other hand, the ingress of atmospheric humidity, the system is provided with a liquid seal 40. Mercury, or an oil of low vapor pressure, such as paraffin oil, or pump oil is used as sealing liquid 41. Ahead of the seal 40 is a safety vessel 42, which prevents return flow of liquid 41 into vessel 36.

It is advantageous to introduce the mixture, at intake 2, 3, at an over-pressure of about one half atmosphere, primarily to overcome the flow resistance, particularly that in the silica gel cooling traps 10 and 11. The overpressure has the further advantage that a comparatively high percentage of the silanes is precipitated in vessel 5.

I claim:

1. In a process for making silicon by heat decomposition of a chloro-silane in the presence of hydrogen, in a gas phase process, wherein hydrogen chloride and higher molecular weight silanes are produced as by-products, in conjunction with unreacted hydrogen and an unreacted quantity of said chloro-silane; the improvement comprising cooling the hot reaction mixture of hydrogen, silanes, and hydrogen chloride, resulting from the said decomposition, in a first stage cooling at a temperature above −85° C. but sufficiently low to separate the silanes as liquids, the hydrogen chloride remaining gaseous, and passing the gases leaving the first stage cooling to a second stage cooling, the second cooling stage being carried out by passing the gases through a body of adsorbent solid cooled to a temperature above −85° C. but sufficiently low to condense residual silanes as liquids, the hydrogen chloride remaining gaseous and being subsequently recovered, the residual silanes being adsorbed.

2. In a process for making silicon by heat decomposition of a chloro-silane in the presence of hydrogen, in a gas phase process, wherein hydrogen chloride and higher molecular weight silanes are produced as by-products, in conjunction with unreacted hydrogen and an unreacted quantity of said chloro-silane; the improvement comprising cooling the hot reaction mixture of hydrogen, silanes, and hydrogen chloride, resulting from the said decomposition, in a first stage cooling at a temperature above −85° C. but sufficiently low to separate the silanes as liquids, the hydrogen chloride remaining gaseous, and passing the gases leaving the first stage cooling to a second stage cooling, the second cooling stage being carried out by passing the gases through a body of adsorbent solid cooled to a temperature above −85° C. but sufficiently low to condense residual silanes as liquids, the hydrogen chloride remaining gaseous and being subsequently recovered, the residual silanes being adsorbed, and washing the residual gases from said second cooling stage with water, to obtain hydrochloric acid.

3. In a process for making silicon by heat decomposition of a chloro-silane in the presence of hydrogen, in a gas phase process, wherein hydrogen chloride and higher molecular weight silanes are produced as by-products, in conjunction with unreacted hydrogen and an unreacted quantity of said chloro-silane; the improvement comprising cooling the hot reaction mixture of hydrogen, silanes, and hydrogen chloride, resulting from the said decomposition, in a first stage cooling at a temperature above −85° C. but sufficiently low to separate the silanes as liquids, the first stage cooling being carried out by initially cooling the gases to cause formation of silane fog, and then agglomerating the fog particles into larger particles by a further cooling in a passage in which the fog particles are in turbulent flow, and settling out the agglomerated silane particles in a zone of larger cross section than said passage, and passing the gases leaving the first stage cooling to a second stage cooling, the second cooling stage being carried out by passing the gases through a body of adsorbent solid cooled to a temperature above −85° C. but sufficiently low to condense residual silanes as liquids, the hydrogen chloride remaining gaseous and being subsequently recovered, the residual silanes being adsorbed, and thereafter recovering the hydrogen chloride and separating the hydrogen.

4. The invention defined in claim 1, the cooling temperature being at about −75° to −84° C.

5. In a process for making silicon by heat decomposition of a chloro-silane in the presence of hydrogen, in a gas phase process, wherein hydrogen chloride and higher molecular weight silanes are produced as by-products, in conjunction with unreacted hydrogen and a unreacted quantity of said chloro-silane; the improvement comprising cooling the hot reaction mixture of hydrogen, silanes, and hydrogen chloride, resulting from the said decomposition, in a first stage cooling at a temperature above −85° C. but sufficiently low to form droplets of silane, agglomerating said droplets into larger drops, and separating the latter, and passing the gases leaving the first stage cooling to a second stage cooling, the second cooling stage being carried out by passing the gases through a body of adsorbent solid cooled to a temperature above −85° C., but sufficiently low to condense residual silanes as liquids, the hydrogen chloride remaining in gas phase, the residual silanes being adsorbed, and thereafter recovering the hydrogen chloride and separating the hydrogen.

6. The invention defined in claim 5, the agglomerating being carried out by cooling and swirling the gas current carrying said droplets, the separation of the drops being by setttling.

7. The invention defined in claim 1, the cooling being carried out at −78° C.

8. The process of claim 1, the adsorbent being silica gel.

9. The process of claim 2, the adsorbent being silica gel.

10. The process of claim 3, the cooling in both stages being between −75° to −84° C., the recited adsorbent being silica gel.

References Cited in the file of this patent

UNITED STATES PATENTS

| | | |
|---|---|---|
| 2,406,605 | Hurd | Aug. 27, 1946 |
| 2,595,620 | Wagner | May 6, 1952 |

FOREIGN PATENTS

| | | |
|---|---|---|
| 659,710 | Great Britain | Oct. 24, 1951 |